E. J. KINGSBURY.
ILLUMINATED SIGN OR ELECTROGRAPH.
APPLICATION FILED JAN. 2, 1917.
Reissued July 8, 1919.
14,682.
3 SHEETS—SHEET 1.
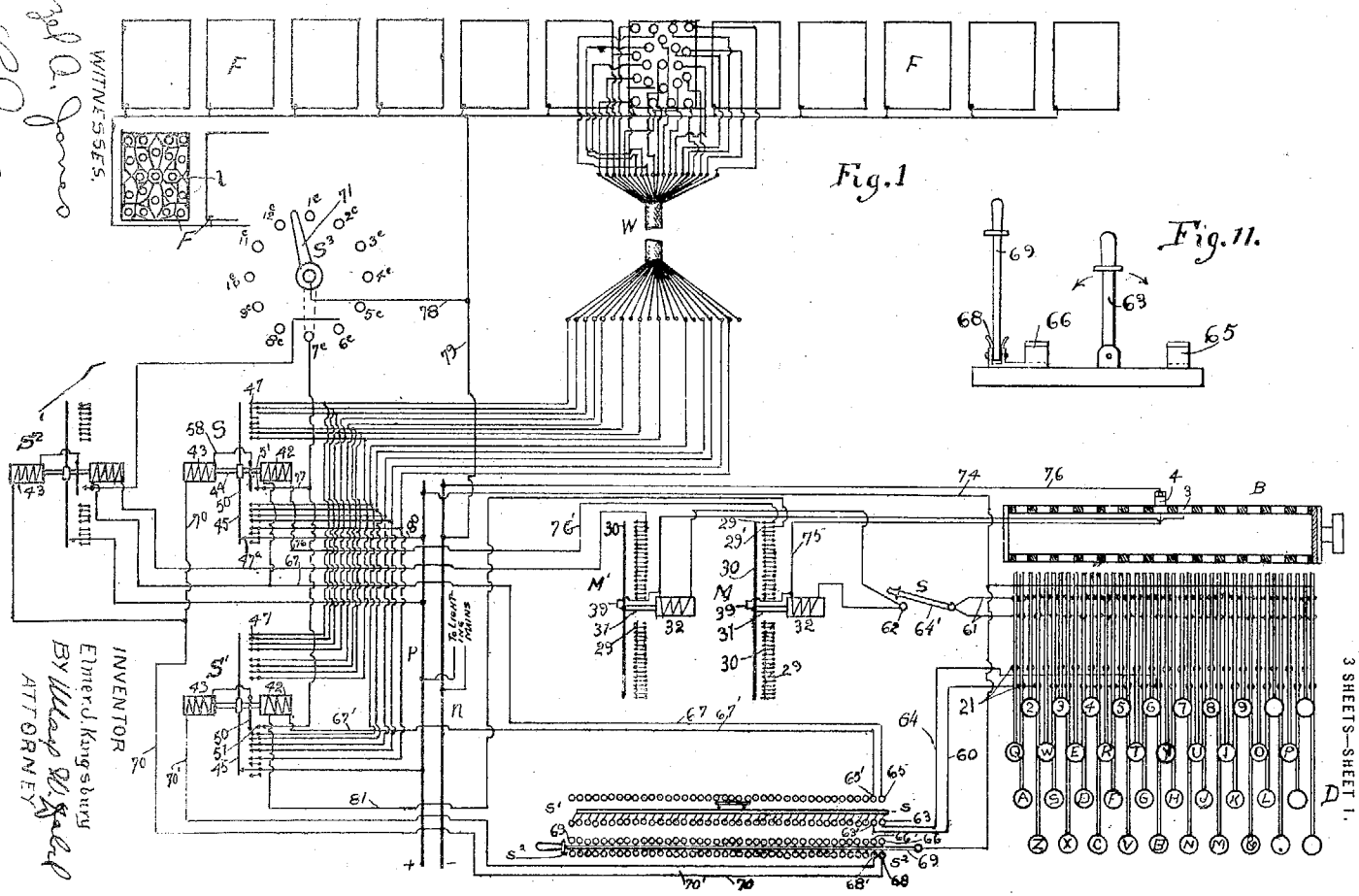
WITNESSES.
Hazel A. Jones
A. L. Jones.
INVENTOR
Elmer J. Kingsbury
BY Wm. W. Gabel
ATTORNEY E. J. KINGSBURY.
ILLUMINATED SIGN OR ELECTROGRAPH.
APPLICATION FILED JAN. 2, 1917.
Reissued July 8, 1919.
14,682.
3 SHEETS—SHEET 2.
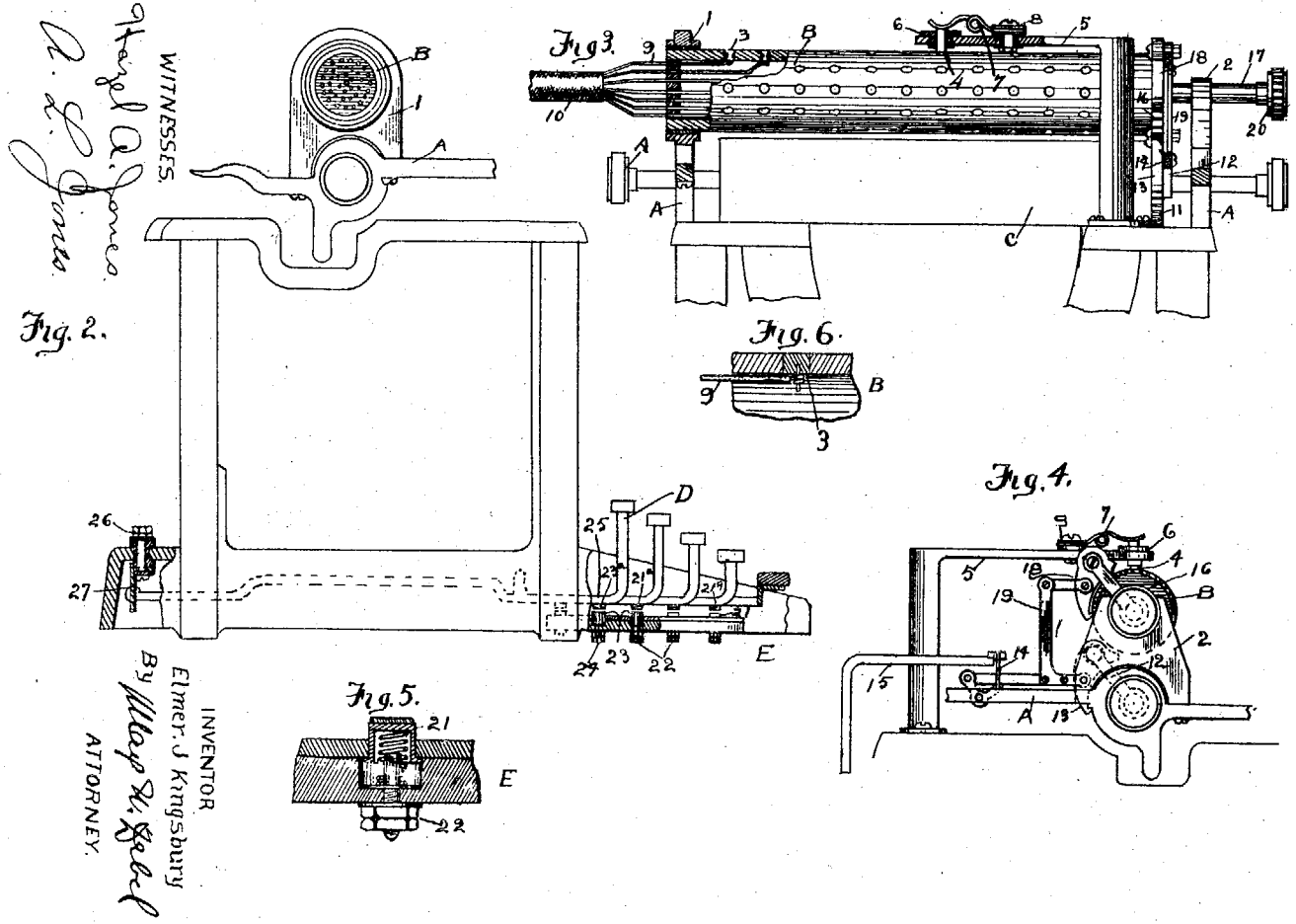

E. J. KINGSBURY.
ILLUMINATED SIGN OR ELECTROGRAPH.
APPLICATION FILED JAN. 2, 1917.
Reissued July 8, 1919.
14,682.
3 SHEETS—SHEET 3.
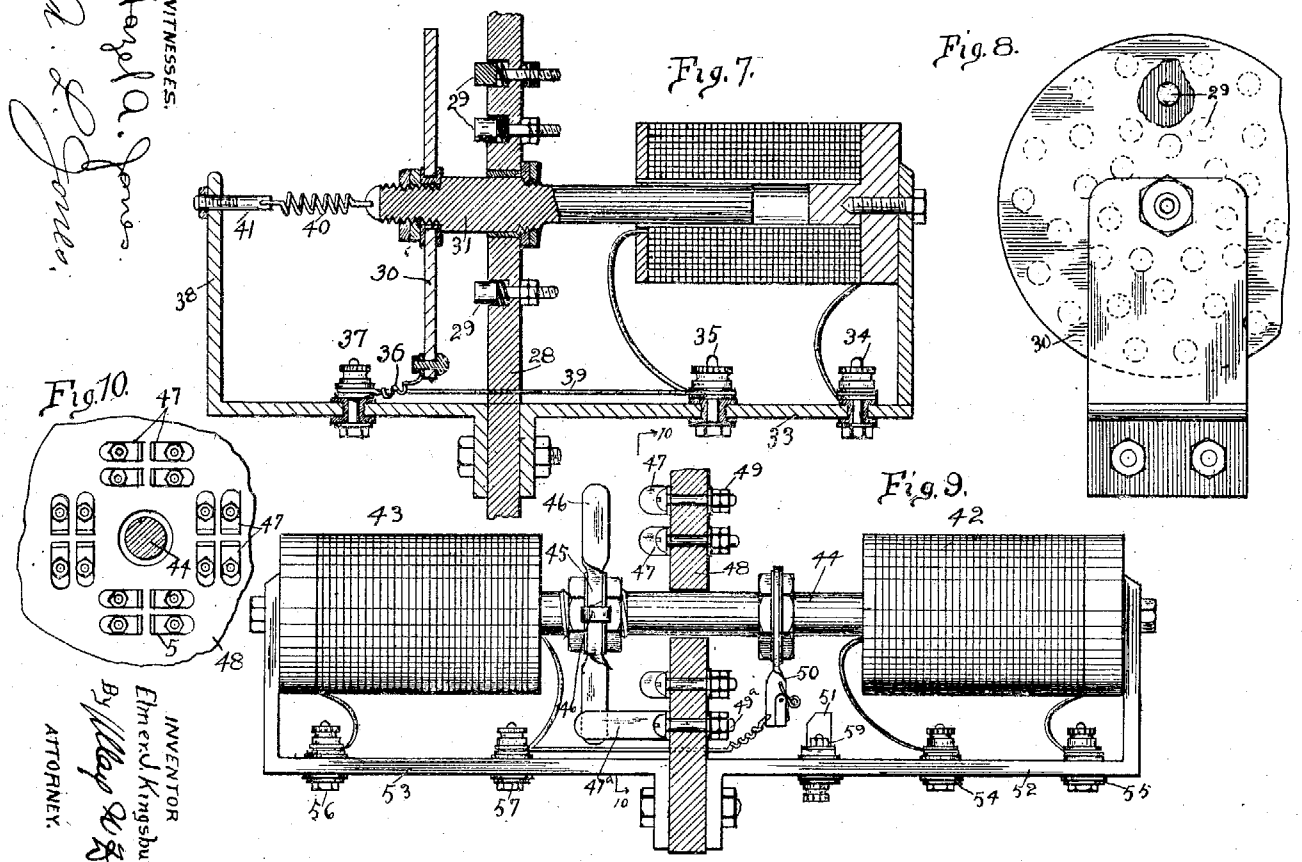
WITNESSES.
Hazel A. Jones.
A. L. Jones.
INVENTOR
Elmer J. Kingsbury.
By Wm. H. Zabel
ATTORNEY.

UNITED STATES PATENT OFFICE.

ELMER J. KINGSBURY, OF CHICAGO, ILLINOIS, ASSIGNOR TO G. HERMAN GAMPER, OF COLUMBUS, OHIO.

ILLUMINATED SIGN OR ELECTROGRAPH.

14,682. Specification of Reissued Letters Patent. Reissued July 8, 1919.

Original No. 1,190,176, dated July 4, 1916, Serial No. 879,471, filed December 29, 1914. Application for reissue filed January 2, 1917. Serial No. 140,312.

*To all whom it may concern:*

Be it known that I, ELMER J. KINGSBURY, a citizen of the United States, and a resident of Chicago, county of Cook, and State of Illinois, have invented a new and Improved Illuminated Sign or Electrograph, of which the following is a full, clear, and exact description.

This invention relates to an illuminated sign of that character which is made up of a plurality of monogram units containing electric light bulbs which can be connected in circuit with a source of current to display letter or figure characters, whereby any desired words or numbers can be exhibited by the sign, the apparatus being of that type whereby a key board similar to the key board of a typewriter is employed for the purpose of illuminating the monograms in successive order to display letters, words or numbers for advertising or other purposes.

The general objects of the present invention are to provide an illuminated electric sign of the character referred to which is thoroughly reliable and efficient in use, easily operated and controlled and so designed that a plurality of lines of monogram units can be embodied in a sign and operated and controlled by a single machine.

A more specific object of the invention is the provision of an attachment for an ordinary typewriter whereby the monogram units can be operated by the keys of the typewriter so that any particular monogram unit, letter or figure will appear therein to correspond to the particular key of the typewriter key board that has been pressed, this effect being brought about through a contact cylinder associated with the typewriter platen and having rows of contacts with which co-operates a fixed brush whereby through the movement of the carriage the brush will engage successive contacts as the keys are successively pressed to illuminate the letters one after another in the monogram units of the sign, and the turning of this cylinder is effected through the line spacer mechanism of the typewriter, whereby one line after another of monogram units can be illuminated.

A further object of the invention is the provision of a system of switches and circuits whereby each key of the typewriter will control a master switch that in turn controls a letter switch for each monogram in the sign in order that any particular letter can be illuminated at any particular monogram unit. Stated in another way, there are as many master switches as there are contacts in each row of contacts in the cylinder associated with the platen of the typewriter, and there are as many letter or character control switches for each monogram unit as there are character keys on the typewriter.

Still another object of the invention is the employment in the electric circuits of means whereby the illuminated character in any monogram unit may be obliterated in case of error and the proper character displayed, and whereby the sign can be easily put out or darkened, so that other matter can be exhibited by the monogram units.

With such objects in view, and others which will appear as the description proceeds, the invention comprises various novel features of construction and arrangement of parts which will be set forth with particularity in the following description and claims appended thereto.

In the accompanying drawings, which illustrate one embodiment of the invention and wherein similar characters of reference indicate corresponding parts in all the views;

Figure 1 is a diagram of sufficient of the various circuits and instrumentalities to enable the invention to be understood;

Fig. 2 is an outlined elevation of a typewriter with the necessary attachments for operating the electric sign;

Fig. 3 is a front view, partly in section, of the contact cylinder associated with the platen;

Fig. 4 is a side view showing the means whereby the contact cylinder is turned step by step as the line spacing mechanism of the typewriter is operated;

Fig. 5 is a detail view of a contact of the contact board associated with the key bars of the typewriter;

Fig. 6 is a detail view of one of the contacts of the contact cylinder;

Fig. 7 is an enlarged sectional view of one of the master switches with its contacts open;

Fig. 8 is an end view of a master switch;

Fig. 9 is an enlarged view, partly in section, of one of the letter or character control switches; showing the same in normal or open circuit position, and Fig. 10 is a detail sectional view on the line 10—10, Fig. 9, to show the contacts with which the individual lamps for a letter or number of a monogram unit are connected;

Fig. 11 is an end view of the switch for connecting the closing magnets of the letter control switches with the contact board of the typewriter and of the switch for controlling the circuits of the releasing magnets.

It is to be understood that a key board and contact cylinder for controlling the monogram units may be made as a separate machine, but in the present instance these parts are shown in connection with an ordinary typewriter. Thus, by reference to Figs. 2, 3 and 4 it will be seen that the platen carriage A has mounted thereon by suitable supports 1 and 2, a contact cylinder B which is provided with longitudinal rows of contacts 3 set into the cylinder B, which may be made of insulation, and flush with the outer surface thereof and mounted to bear on the cylinder is a brush or relatively fixed contact 4 carried by a stationary arm 5 from which the brush is insulated by a bushing 6, said brush being pressed into contact with the drum by a spring 7 which is a conductor for current, and this spring is connected with a binding post 8, by which the brush is connected in an electric circuit. Each contact 3 of the cylinder is connected by a separate wire 9, and these wires lead out of one end of the cylinder and comprise a cable or cord 10 that leads to the various master switches. It will be understood that the contact cylinder moves step-by step as the platen carriage A of the typewriter moves, and consequently the brush 4 will successively engage the contacts of the row that is directly underneath the brush. In order to rotate the contact cylinder the same is operatively connected with the line spacing mechanism of the typewriter in any suitable manner. This line spacing mechanism for turning the platen C is shown in the present instance as a ratchet wheel 11, and a swinging arm 12 having a pawl 13 which is connected through the parts 14 with the line spacer operating lever or arm 15, so that when the arm is actuated the platen turns one line space. At the same time the contact cylinder B is turned a corresponding distance, this being accomplished by the ratchet wheel 16 connected with the shaft 17 of the cylinder, a pawl 18 and a connection 19 between such pawl and the pawl operating means 14 of the platen C. If desired the typewriter may be used in the ordinary way to typewriter matter which is to be exhibited by the sign, and thus a record can be kept of such exhibited matter. To prevent the cable from kinking the cylinder B can be turned backwardly by turning the knob 20 while the pawl 18 is released from the ratchet wheel 16. Under the bank of keys D of the typewriter is arranged a contact board E which has rows of yielding contacts 21, one for each key, and each of which is equipped with a binding post 22 to which the wires leading to the letter control switches are connected, and also in this contact board E are contacts 23, one for each key, and which have their binding posts 24 connected with the electromagnets of all the master switches. Suitably mounted on each key bar 25 are contacts $21^a$ and $23^a$ for engaging respectively the contacts 21 and 23, so that when any key D is depressed, one terminal of a master switch and of a letter control switch will be connected with one side of a source of current. The other terminal of such master switch will be connected with the other side of the source of current through the contact cylinder and brush of the typewriter, and the other terminal of such letter control switch will be connected with the opposite side of the source of current by the engaged contacts of the master switch. All the key bars 25 are adapted to be connected with a circuit wire which is fastened to a binding post or equivalent means 26, Fig. 2, which binding post is electrically connected to the fulcrum bar 27 for the key bar 25, but obviously any other suitable means may be employed to connect the key bars in circuit.

Each master switch, as shown in Figs. 7 and 8, comprises an insulating support 28 which has a plurality of yieldingly mounted relatively stationary contacts 29 with all of which a contact plate 30 is adapted to engage when the key for such master switch is depressed. The contact plate 30 is fastened to and insulated from an armature 31 of a solenoid or magnet 32 which is fastened to a suitable supporting bracket 33 fixed on or with respect to the contact supporting insulating plate 28. The terminals of the winding are connected with binding posts 34 and 35 mounted in the bracket 33 and insulated therefrom. The solenoid 32 when energized draws the armature or core 31 inwardly or toward the right, Fig. 7, so that the contact plate 30 will engage all of the contacts 29, which latter yield so that a good electrical engagement will be maintained between each of the same and contact plate 30. There are as many contacts 29 in each master switch as there are keys or characters to be illuminated in a monogram unit, and therefore each contact 29 will be connected by a wire with an individual letter or character switch. The contact 30 is adapted to be connected in circuit in any suitable manner, as, for instance, by a flexible wire 36 connected with a binding post 37 mounted on and insulated from a bracket 38, which binding post is connected by a wire 39 with the binding post 35. The armature 31 is retracted by a spring 40 which has one end fastened to the armature and the other end fastened to a bolt 41 carried by and adjustable in the bracket 38, so as to vary the tension of the spring 40.

Each character control switch is constructed as shown in Figs. 9 and 10, and comprises oppositely disposed solenoids or magnets 42 and 43 which operate on a common core or armature 44. This armature carries a cruciform contact 45, the arms 46 of which are adapted to engage between pairs of oppositely disposed contacts 47 fastened to an insulating support 48 through which the armature 44 passes. Each contact 47 is provided with a binding post 49 for connecting a wire thereto that leads to a lamp in the monogram unit. The contact 45 has one of its arms permanently in engagement with a contact $47^a$ which is longer than the contacts 47, so that engagement is maintained throughout the range of movement of the movable contact 45, and this contact $47^a$ has its binding post $49^a$ connected with the positive side of the source of current, so that when the movable contact 45 has its arms engaged with the contacts 47, all of the lamps necessary for a letter or number in a monogram will be lighted. The solenoid or magnet 42 operates to close the lamp circuits by such magnet drawing the armature to the right, Fig. 9, and the magnet or solenoid 43 acts on the armature in the opposite direction, so at to open the lamp circuits. Normally the parts are in the position shown in Fig. 9, and the coil 42 is energized when the corresponding key bar of the typewriter is pressed. At the same time the lamp contacts 46, 47 are closed by the movement of the armature 44, and other contacts are engaged to connect the releasing or opening coil 43 with a wire that is adapted to be connected with the negative side of the source of current when it is desired to extinguish the monogram that was lighted by the contacts 46 and 47 engaging when the coil 42 was energized. These contacts 50 and 51 are so arranged that they engage each other when the armature 44 moves to the right, the contact 50 being carried by the armature but insulated therefrom while the contact 51 is fixed. The magnets 42 and 43 are secured respectively to brackets 52 and 53, and on the bracket 52 are binding posts 54 and 55 whereby the terminals of the magnet are connected in circuit, and on the bracket 53 are binding posts 56 and 57 to which the terminals of the magnet 43 are connected. A flexible wire 58 connects the binding posts 57 with the movable contact 50, and the fixed contact 51 has a binding post 59 by which one terminal of the releasing magnet 43 is connected with the negative side of the source of current, the other terminal of such magnet being connected with the positive side. The contact 50 is designed so as to effect a quick breaking of the circuit when the armature 44 is drawn to the left by the energizing of the magnet 43.

The operation of the system will be described more particularly in connection with Fig. 1, which is a diagram of the circuit connections and instrumentalities suitable for a multiple line sign, but it is to be understood that the invention can be carried out in connection with a single line of monogram units. The monogram units F are arranged in one or more lines, and there may be as many units as there are contacts 3 in the contact drum of the typewriter. Each monogram is provided with lamps 1, each of which has a wire connected with one terminal and leading to as many letter control switches as are employed to show the various letters or characters in each monogram unit, and the other terminal of each lamp is connected with a common ground wire leading to the negative side of the source of current. It will be understood that the lamps 1 will be so arranged in each monogram and associated with the light reflecting surfaces that various groups of lamps can be selected to show the outlines of the various letters and numbers. As each monogram unit is capable of exhibiting any one of the twenty-seven letters contained in the typewriter key board, and any one of the eight ordinals contained in such keyboard, there will of necessity be employed in connection with each monogram thirty-five letter or character control switches. For clearness of illustration only three of these switches, S, S′, $S^2$ are shown, the first two being used in connection with a first line monogram and the switch $S^2$ with a second line monogram. For the same reason only two master switches M and M′ are shown, but it will be understood that one master switch is used for each monogram unit, and by means of it all thirty-five letter control switches for such monogram unit will be controlled. The operator must, in addition to operating the typewriter keys manipulate certain manual switches. A switch *s* serves to connect all of the solenoids 32 of the master switches with the positive side of the source of current, and a double throw multiple contact switch *s′* serves to contact all of the closing magnets 42 of the letter control switches with the contact board of the typewriter when the knife element of the said switch is in one position and when the knife element is in its other extreme position it coöperates with another switch $s^2$ for closing the circuits of the releasing or opening magnets 43 of the letter control switches, whereby any or all of the monograms can be darkened or obliterated. The switch $s$ has its movable contact 60 connected by one or more wires 61 with the contacts 23 of the typewriter key board, and the associated contact 62 of the switch $s$ is connected with one terminal of each of the magnets 32 of the master switches, and this switch $s$ is closed all the time the typewriter is in use for exhibiting letters or figures by the monogram units, but when any letter of the whole sign is to be extinguished the switch $s$ is thrown open and the switches $s'$ and $s^2$ properly manipulated so that the releasing magnets 43 will be energized. The switch $s'$ comprises a plurality of movable contacts or knife blades 63, 63′, etc., that are connected individually by wires 64, 64′, etc., with the individual contacts 21 of the keyboard of the typewriter. As this switch $s$ is of the double throw type it has two sets of fixed contacts 65, 65′, etc. and 66, 66′, etc., the first set of fixed contacts being connected by wires 67, 67′, etc., with the closing magnets 42 of the various letter control switches, and the other set of contacts 66, 66′, etc. is connected with corresponding contacts 68, 68′, etc., of the switch $s^2$, which latter switch includes a single movable contact blade 69 pivoted at the right end, Fig. 1, and which simultaneously engages all the fixed contacts 68, 68′, etc., for the purpose of connecting all the releasing or opening magnets 43 of the letter control switches with the positive side of the source of current, and therefore the contacts 68, 68′, etc. are connected by wires 70, 70′, etc., with the magnets 43 of the respective letter control switches. A monogram line switch $s^3$ is employed to connect the closing or releasing magnets 43 to the negative side of the source of current. When the movable element 71 of this switch is in the dotted line position the magnet 43 of all the letter control switches for the first line of monograms can be connected with the negative side of the source of current, whereby the first line of monograms can be extinguished, and when the monograms of the second line are to be extinguished the movable contact 71 is shifted from the contact $7^c$ to the second contact $6^c$, whereby the magnets 43 of the letter control switches associated with the second line of monogram units will be connected with the negative side of the circuit, and in this manner line after line can be extinguished.

It will be understood that the thirty-five letter control switches for each monogram will have their contacts 47 connected with the various lamps of the associated monogram units by a cable of wires W, there being in each cable approximately as many wires as there are lamps, and these wires at the letter control switches S, S′, etc., will be branched and extended to the particular contacts 47 in each switch necessary to close the circuit of the group of lamps that will make the letter or number which the particular letter control switch is intended to control.

In describing the operation of the apparatus it will be assumed that the first six monograms in the first line have been produced by the operation of the appropriate keys of the typewriter and the operator is about to press the key for the seventh monogram. It will be noted that the contact brush 4 is in engagement with the seventh contact 3 of contact cylinder B. It is also to be assumed that the switch $s$ is closed and that the blade elements of the double throw switch $s'$ are thrown upwardly. When the key is pressed current flows from the positive bus bar $p$ through the wire 74 to the particular key bar that is pressed, namely, the key bar having the character A, through the wire 61, switch $s$, electromagnet 32 of master switch M, wire 75, brush 4, wire 76, and negative bus bar $n$. This current energizes the electromagnet 32 of the master switch M, and the contact plate 30 thereof engages the contacts 29 so as to complete the circuit of the closing magnet 42 of the letter control switch corresponding to the key that is pressed; that is to say, the switch that will produce the letter A in the seventh monogram when the A key is pressed by the operator. The current divides at the key bar of the letter A and flows through the wire 64, contacts 63 and 65 of the switch $s'$, wire 67, magnet 42 of the letter control switch S, wire 76′, contacts 29 and 30 of master switch M, wires 39 and 75, brush 4, wire 76′, and negative bus bar $n$. If by mistake a wrong key is pressed it is necessary to extinguish the monogram that has been lighted and replace it by the proper one, and to do this the operator opens the switch $s$ and reverses the switch $s'$, and after the typewriter carriage is shifted to bring the seventh contact 3 under the brush the same key is pressed again. When the key is pressed, current passes from the positive bus bar $p$ through the wire 74, switch bar 69, contact 68, wire 70, opening or releasing magnet 43 of letter control switch S, wire 58, contacts 50, 51, wire 77, contacts $7^c$, 71 of the monogram line switch $s^3$, wires 78 and 79 and negative bus bar $n$. This current energizes the magnet 43 and attracts the armature 44 to the left, whereby the monogram of the seventh monogram unit is opened, resulting in the monogram being extinguished, and at the same time the circuit of the magnet 43 is opened by the contact 50 separating from the contact 51. The operator now displays the proper monogram in the seventh unit by opening the switch $s^2$, closing the switch $s$, and throwing the movable element of the switch $s'$ upwardly so as to connect the closing magnets 42 of the letter control switches with the contact board of the typewriter, and then the key A is pressed so that the proper letter will be exhibited in the seventh monogram unit.

The flow of current in the letter or monogram circuit follows the path consisting of the positive bus bar *p*, wire 80, contact 47[a] of the letter control switch S, movable contact 45, contacts 47, wires W, lamps *l*, common return wire 79 and negative bus bar *n*. Obviously only those contacts 47 will be connected with the wires W that are necessary for illuminating those lamps which will form the character A. If the character B is to be exhibited the operator will press the key B, and as a consequence a different letter control switch will be brought into play. When this key B is depressed the master switch M will be closed by the energizing of the magnet 32 as hereinabove explained, and at the same time current will flow through the circuit of the letter control switch S′ that will produce the letter B in the seventh unit of the sign, the current flowing through a path consisting of the positive bus bar *p*, wire 74, key bar of the key B, wire 64′ and contacts 63′ and 65′, wire 67′, magnet 42 of the switch S′, wire 81, contacts 29′ and 30, wires 39 and 75, brush 4, wire 76 and negative bus bar *n*. Let it be assumed that the contact cylinder B of the typewriter has now moved so that the brush 4 will be in contact with the eighth contact 3, and under these conditions when any key of the typewriter is pressed the master switch M′ will be actuated and simultaneously the letter control switch corresponding to the key pressed will be actuated so that the monogram desired will appear in the eighth monogram unit of the sign. The movable contact of a master switch is in closed condition only as long as a key is pressed, as the spring connected with the armature of the master switch immediately opens the circuit when the typewriter key is raised. In the letter control switch, however, the movable element thereof remains in closed circuit position until the operator desires to extinguish the monogram, when the movable contact will be moved to open circuit position by the energizing of the opening magnet 43 which the operator controls by the switches *s*, *s*′, $s^2$ and $s^3$ as hereinbefore described.

The contact cylinder B is shown with only twelve contacts 3 in a row, as shown in Fig. 1, but it is to be understood that these contacts can be arranged closer together so that the carriage of the typewriter can move in steps each equal to the width of a typewriter key. With the contacts 3 arranged as shown it will be necessary to make use of the tabulating stops of the typewriter so that the carriage will make twelve steps in its complete movement. The monogram switch $s^3$ has as many contacts as there are monogram units in a row, these contacts being designated 1[c] to 12[c] in Fig. 1.

Having thus described my invention, I claim as new and desire to secure by Letters Patent:

1. In an electric sign, the combination of a plurality of monogram units having devices adapted to be energized in predetermined groups to exhibit letters, a source of current, a set of keys, letter-control switches for each monogram unit equal in number to the number of keys, electrical means for closing each switch and connected with the corresponding key to be energized when the latter is pressed, a series of master switches, one for each monogram unit, and each including contacts for connecting all the letter-control switches for a monogram unit with the source of current, electrical operating means for each master switch for closing the latter when the corresponding key is pressed, and means for connecting the electrical closing means and contacts of the master switches successively with the source of current as the keys are pressed.

2. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, a carriage movable step by step as the keys are pressed, and means on the carriage for connecting the electrical closing means and contacts of the master switches successively with the source of current.

3. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, a carriage movable step-by step as the keys are pressed, a cylinder on the carriage and provided with a plurality of sets of contacts connected respectively with the electrical closing means and contacts of the master switches, a fixed contact connected with the source of current and with which contacts on the cylinder successively engage, and means for turning the cylinder to present the sets of contacts thereof successively to the fixed contact.

4. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, means for connecting the electrical closing means and contacts of the master switches successively with the source of current and automatically as the keys are pressed, and an electrical means at each letter control switch to open the same and blank the monogram.

5. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, means for connecting the electrical closing means and contacts of the master switches successively with the source of current and automatically as the keys are pressed, an electrical means at each letter control switch to open the same and blank the monogram, and normal separated contacts in the circuit of said last electrical means and adapted to engage when the associated letter control switch closes by the first mentioned electrical means thereof.

6. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, means for connecting the electrical closing means and contacts of the master switches successively with the source of current and automatically as the keys are pressed, an electrical opening means for each letter control switch, a manually operated switch whereby either the electrical opening means or the said electrical closing means of a letter control switch will be connected with the said source when a key is pressed.

7. In an electric sign, the combination of a plurality of monogram units having devices adapted to be energized in predetermined groups to exhibit letters, a source of current, a set of keys, letter control switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, means for connecting the electrical closing means and contacts of the master switches successively with the source of current and automatically as the keys are pressed, an electrical opening means for each letter control switch, a manually operated switch whereby either the electrical opening means or the said electrical closing means of a letter control switch will be connected with the said source when a key is pressed, and means for connecting electrical opening means of all the letter control switches with the source of current independently of the keys for blanking the whole sign.

8. In an electric sign, the combination of a plurality of monogram units having devices adapted to be energized in predetermined groups to exhibit letters, a source of current, a set of keys, letter controlled switches for each monogram unit equal in number to the number of keys, electrical means for closing each switch and connected with the corresponding key to be energized when the latter is pressed, a series of master switches, one for each monogram unit, and each including contacts for connecting all the letter control switches for a monogram unit with the source of current, electrical means for each master switch for closing the latter when the corresponding key is pressed, means for connecting the electrical closing means and contacts of the master switches successively with the source of current and automatically as the keys are pressed, an electrical opening means for each letter control switch, a manually operated switch whereby either the electrical opening means or the said electrical closing means of a letter control switch will be connected with the said source when a key is pressed, means for connecting electrical opening means of all the letter control switches with the source of current independently of the keys for blanking the whole sign, and means for connecting or disconnecting the master switches and keys.

9. The combination of a monogram unit having devices for forming letters, a source of current, a set of keys, a letter control switch for each key, said switch including a movable contact connected with one side of the said source and a plurality of relatively fixed contacts, a wire leading from each fixed contact to a device of the monogram unit, a wire leading from all the devices of the monogram unit to the other side of the source of current whereby current flows through the devices when the movable contact engages the fixed contacts, a magnet for moving the movable contact to closed circuit position, a magnet for moving the movable contact to open circuit position, and a switch whereby either magnet will be connected with the source of current when a key is depressed.

10. The combination of a monogram unit having devices for forming letters, a source of current, a set of keys, a letter control switch for each key, said switch including a movable contact connected with one side of the said source and a plurality of relatively fixed contacts, a wire leading from each fixed contact to a device of the monogram unit, a wire leading from all the devices of the monogram unit to the other side of the source of current, whereby current flows through the devices when the movable contact engages the fixed contacts, a magnet for moving the movable contact to closed circuit position, a magnet for moving the movable contact to open circuit position, a master switch controlling the letter control switches and having a movable contact and a plurality of fixed contacts each connected with a closing magnet for a letter control switch, electrical means controlled by a key for closing the master switch, and a switch for connecting either the opening or the closing magnets of the letter control switches with the keys.

11. The combination of a plurality of monogram units having devices for forming letters, a source of current, a set of keys, a letter control switch for each key, said switch including a movable contact connected with one side of the said source and a plurality of relatively fixed contacts, a wire leading from each fixed contact to a device of the monogram unit, a wire leading from all the devices of the monogram unit to the other side of the source of current, whereby current flows through the devices when the movable contact engages the fixed contacts, a magnet for moving the movable contact to closed circuit position, a magnet for moving the movable contact to open circuit position, a plurality of master switches equal in number to the number of monogram units and each controlling all the letter control switches of a unit, each master switch having a movable contact and a plurality of fixed contacts each connected with a closing magnet for a letter control switch, electrical means controlled by a key for closing each master switch, a manually actuated switch for opening the circuit of the said electrical means for the master switches, a manually actuated double throw switch whereby all the closing magnets or all the opening magnets are connected to the respective keys, and a manually actuated switch for connecting all the opening magnets in circuit directly with the source of current for simultaneously opening all the letter control switches.

12. A system of the character described having a plurality of sign units each adapted to portray any one of a given number of dissimilar characters, said sign units each having a plurality of selectively operable sign elements, means for operating said elements to cause the appearance of display characters in said units, said means including individual character keys, and means controlled by re-operation of the respective key for obliterating the character set up in any given unit without obliterating the characters set up in the remaining units.

13. A system of the character described having a plurality of sign units each adapted to portray any one of a given number of dissimilar characters, said sign units each having a plurality of selectively operable sign elements, means including a key board for operating said elements to cause the appearance of display characters in said units, said key board having individual character keys, and means controlled by the re-operation of the respective key for obliterating the character set up in any given unit without obliterating the characters set up in the remaining units.

14. A system of the character described having a plurality of sign units each adapted to portray any one of a given number of dissimilar characters, said sign units each having a plurality of selectively operable sign elements, means including individual character keys for operating said elements to cause the appearance of display characters in said units, said means including a plurality of character controlling sign element operating relays, and means controlled by the re-operation of the respective key for obliterating the character set up in any given unit without obliterating the characters set up in the remaining units.

15. A system of the character described having a plurality of sign units each adapted to portray any one of a given number of dissimilar characters, said sign units each having a plurality of selectively operable sign elements, means including individual character keys for operating said elements to cause the appearance of display characters in said units, said means including a plurality of character controlling sign element operating relays, and means for obliterating the character set up in any given unit without obliterating the characters set up in the remaining units, said means including restoring relays, and means for individually operating the restoring relay of a given sign unit by the re-operation of the respective character key.

16. A system of the character described having a plurality of sign units each adapted to portray any one of a given number of dissimilar characters, said sign units each having a plurality of selectively operable sign elements, means including individual character keys for operating said elements to cause the appearance of display characters in said units, means controlled by the reoperation of the respective key for obliterating the character set up in any given unit without obliterating the characters set up in the remaining units, and means for simultaneously obliterating the characters set up in all of the units.

17. A system of the character described having a plurality of sign units, each adapted to portray any one of a given number of dissimilar characters, said sign units each having a plurality of selectively operable sign elements, and means for operating said elements to cause the appearance of predetermined display characters in said units, said means including a stationarily mounted key board, means associated with the keys of said key board for controlling the selection of desired sign elements in accordance with the corresponding key, and a rotatable circuit control mechanism operable with the keys of said key board to control the association of said key board with said sign units in succession.

18. A system of the character described having a plurality of sign units each adapted to portray any one of a given number of dissimilar characters, said sign units each having a plurality of selectively operable sign elements, and means for operating said elements to cause the appearance of predetermined display characters in said units, said means including a stationarily mounted key board, means associated with the keys of said key board for controlling the selection of desired sign elements in accordance with the corresponding key, and master control mechanism mechanically controlled by said keys to control the association of said key board with one after another of said sign units.

19. A system of the character described having a plurality of sign units each adapted to portray any one of a given number of dissimilar characters, said sign units each having a plurality of selectively operable sign elements, and means for operating said elements to cause the appearance of predetermined display characters in said units, said means including a stationarily mounted key board, means associated with the keys of said key board for controlling the selection of desired sign elements in accordance with the corresponding key, and master control mechanism operable with said keys to control the association of said key board with one after another of said sign units, said master control mechanism including a rotatable cylinder having contacts corresponding to said sign units.

20. In an electric sign the combination of a monogram unit having devices adapted to be energized in predetermined groups to exhibit letters, a source of current, a set of keys, letter control switches equal in number to the number of keys, electrical means for closing each switch and connected with the corresponding key to be energized when the latter is pressed, a series of master switches, one for each monogram unit, and means mechanically controlled by said keys for selecting said master switches in rotation.

In witness whereof I hereunto subscribe my name this 13th day of October, 1916.

ELMER J. KINGSBURY.

Witnesses:
HAZEL A. JONES,
A. L. JONES.